(12) United States Patent
Bogdan et al.

(10) Patent No.: US 12,468,929 B2
(45) Date of Patent: Nov. 11, 2025

(54) SELF-OPTIMIZING AND SELF-PROGRAMMING COMPUTING SYSTEMS: A COMBINED COMPILER, COMPLEX NETWORKS, AND MACHINE LEARNING APPROACH

(71) Applicant: UNIVERSITY OF SOUTHERN CALIFORNIA, Los Angeles, CA (US)

(72) Inventors: Paul Bogdan Bogdan, Los Angeles, CA (US); Shahin Nazarian, Los Angeles, CA (US); Yao Xiao, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 730 days.

(21) Appl. No.: 16/990,391

(22) Filed: Aug. 11, 2020

(65) Prior Publication Data

US 2021/0049465 A1 Feb. 18, 2021

Related U.S. Application Data

(60) Provisional application No. 62/885,517, filed on Aug. 12, 2019.

(51) Int. Cl.
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
CPC .......... G06F 8/443; G06N 3/08; G06N 3/045; G06N 7/01; G06N 3/084; G06N 3/088; G06N 3/006
See application file for complete search history.

(56) References Cited

U.S. PATENT DOCUMENTS

2019/0294959 A1\* 9/2019 Vantrease .............. G06N 3/063
2019/0361802 A1\* 11/2019 Li ............................ G06F 8/40

OTHER PUBLICATIONS

Chen, Z. et al., "Supervised Community Detection with Line Graph Neural Networks", https://arxiv.org/abs/1705.08415v5 (Year: 2018).\*

(Continued)

*Primary Examiner* — Alexey Shmatov
*Assistant Examiner* — Devika S Maharaj
(74) *Attorney, Agent, or Firm* — Brooks Kushman P.C.

(57) ABSTRACT

A self-optimizing and self-programming computing system (SOSPCS) design framework that achieves both programmability and flexibility and exploits computing heterogeneity [e.g., CPUs, GPUs, and hardware accelerators (HWAs)] is provided. First, at compile time, a task pool consisting of hybrid tasks with different processing element (PE) affinities according to target applications is formed. Tasks preferred to be executed on GPUs or accelerators are detected from target applications by neural networks. Tasks suitable to run on CPUs are formed by community detection to minimize data movement overhead. Next, a distributed reinforcement learning-based approach is used at runtime to allow agents to map the tasks onto the network-on-chip-based heterogeneous PEs by learning an optimal policy based on Q values in the environment.

27 Claims, 9 Drawing Sheets

(56) References Cited

OTHER PUBLICATIONS

Paul, S., "An Introduction to Q-Learning: Reinforcement Learning", May 2019, https://web.archive.org/web/20190516080122/https://blog.floydhub.com/an-introduction-to-q-learning-reinforcement-learning/ (Year: 2019).*
"Wikipedia—LLVM", https://web.archive.org/web/20190117003333/https://en.wikipedia.org/wiki/LLVM, Jan. 2019 (Year: 2019).*
"Wikipedia—Intermediate Representation", https://web.archive.org/web/20190101155520/https://en.wikipedia.org/wiki/Intermediate_representation, Jan. 2019 (Year: 2019).*
Fortunato, S., "Community detection in graphs", https://arxiv.org/abs/0906.0612 (Year: 2010).*
Cordes, D. et al., "Automatic Parallelization of Embedded Software Using Hierarchical Task Graphs and Integer Linear Programming", https://dl.acm.org/doi/10.1145/1878961.1879009 (Year: 2010).*
Cheng, M. et al., "DRL-Cloud: Deep Reinforcement Learning-Based Resource Provisioning and Task Scheduling for Cloud Service Providers", https://ieeexplore.ieee.org/document/8297294 (Year: 2018).*
Y. Xiao, S. Nazarian and P. Bogdan, "Self-Optimizing and Self-Programming Computing Systems: A Combined Compiler, Complex Networks, and Machine Learning Approach," in IEEE Transactions on Very Large Scale Integration (VLSI) Systems, vol. 27, No. 6, pp. 1416-1427, Jun. 2019.

\* cited by examiner

SELF-OPTIMIZING AND SELF-PROGRAMMING COMPUTING SYSTEMS: A COMBINED COMPILER, COMPLEX NETWORKS, AND MACHINE LEARNING APPROACH

CROSS-REFERENCE TO RELATED APPLICATIONS

This application claims the benefit of U.S. provisional application Ser. No. 62/885,517 filed Aug. 12, 2019, the disclosure of which is hereby incorporated in its entirety by reference herein.

STATEMENT REGARDING FEDERALLY SPONSORED RESEARCH OR DEVELOPMENT

This invention was made with government support under N66001-17-1-4044 awarded by the Defense Advanced Research Projects Agency (DARPA), W911NF-17-1-0076 awarded by Defense Advanced Research Projects Agency (DARPA), and CPS-1453860 awarded by the National Science Foundation (NSF). The government has certain rights in the invention.

TECHNICAL FIELD

In at least one aspect, the present invention is related to self-optimizing and self-programming computing systems.

BACKGROUND

Today, multicore platforms can solve general types of problems with the help of programmers. Programming flexibility is the primary reason why general-purpose machines have been adopted. However, programmers would not be offered with necessary capabilities to run algorithms efficiently, as they have to trade off the efficiency of their algorithms with the available hardware components [29]. With the advent of tensor processing units (TPUs) [17] dedicated to accelerating deep learning algorithms and some hardware accelerators (HWAs) for image processing, domain-specific accelerators [5] can typically improve performance with less energy.

Nevertheless, to exploit the high degree of parallelism available on multicore platforms, programmers write multithreaded applications where multiple threads are spawned and mapped onto cores by the operating system (OS). These threads share data by storing one copy of the data into the data cache. If one thread updates the shared variable, the same new copy has to be broadcast to the rest of cores in order to keep information consistent. Network-on-Chip (NoC) has been proven effective for data transfer among cores. For each core, there exists a router to transfer data from one node to another, and the router keeps track of the next node to which flits should be sent. However, there are drawbacks associated with each approach:

General-purpose machines are not as efficient as specialized accelerators. The compute engines for these machines are designed to be simple and general such as floating-point adders, multipliers, and dividers. For compute-intensive applications like signal processing consisting of millions of operations, running these applications on general-purpose machines is inefficient compared to specialized HWAs tailored to specific computations.

Domain-specific accelerators lack programmability and add complexity to OS design. Domain-specific accelerators [5] are specific to one domain. For example, TPU [17] dedicates a large area for matrix multiplication (MM) unit to speed up deep neural network (NN) algorithms consisting of a huge amount of MM operations. However, applications without these operations cannot be executed in TPU. Furthermore, with available on-chip accelerators, the OS should decide the following: 1) the components of each task (e.g., if OS decides a task consisting of fast Fourier transform (FFT) plus some sequential code, the FFT accelerator cannot execute it due to the inflexibility of execution of general programs) and 2) the mapping of tasks onto processing elements (PEs) such as CPUs, GPUs, and accelerators with low network latency and high performance. Tasks with FFT are required to be mapped onto the FFT accelerator, and highly intercommunicating tasks are mapped to nearby PEs for high performance.

NoC Consumes a Significant Portion of System Power Due to Data Movement. Several NoC prototypes demonstrated that approximately 30% of the total energy is spent on NoC in the Intel 80-core Terascale chip [12] and 40% in the MIT RAW chip [37]. Furthermore, [19] reported that data movement consumes, on average, 25% of the total energy.

Within the cyber-physical systems era, future hardware platforms will perform streaming and steering computations [10]. Streaming applications require inputs as unbounded sequences of various types of events to be sequentially applied to each application (without random accesses) which needs near real-time processing and can have multiple consumers and producers. Steering is defined as the ability to dynamically control the progression of each computational process to support decision-making, such as the mapping of tasks and the control of autonomous vehicles. For example, in autonomous cars, data streams are unbounded and heterogeneous as the vehicles require the real-time vision of roads, streets, and cars in order to react on the direction and speed. In addition, the autonomous vehicles allow for dynamic steering (turn left/right or stop) in case of a real-time event (the change of traffic lights). Therefore, simple heuristics are difficult to cover all possible cases under heterogeneous data streaming and steering. Reinforcement learning (RL)-based distributed intelligent scheduling has proven to be very promising in reacting in real-time and allows the dynamic control of events such as traffic congestion in the interconnect and task scheduling in cloud computing [6].

The complex software applications with fixed deadlines and parallel programming require high-performance heterogeneous computing platforms. Efficient application mapping methods are studied to improve performance or energy consumption on complex computing systems. Design-time mapping methods [4], [7], [13], [15], [25], [33], [39], [40] are suitable for static workloads where computations and communications are well-known. Runtime mapping methods [1], [34], [35], [38] allow dynamic mapping of tasks considering the inefficiency of static mapping. Hybrid mapping [20], [22], [30], [32] combines design-time mapping with runtime mapping to overcome the drawbacks.

Several of the issues set forth above are addressed in the prior art as follows. Thiele et al. [39] proposed a distributed operation layer mapping framework for efficient parallel execution on multi-cores via performance analysis and an evolutionary-based multi-objective optimization. Castrillon et al. [4] presented a new Kahn process network (KPN) mapping algorithm to address issues in terms of both communication and computation. Their heuristics called group-based mapping to assign processes and channels of KPN applications onto heterogeneous multiprocessor system-on-chips (MPSoCs). Choi et al. [7] proposed an evolutionary algorithm-based scheduling technique to address a limited size of scratchpad memory (SPM) on a multicore platform for synchronous dataflow applications. To reduce memory latency, prefetching is performed to fetch data from SPM concurrently with computation.

Ahmed et al. [1] proposed a novel scheme for adaptive run-time resource management in reconfigurable multicore processors. At compile time, it analyzes the criticality of each task to constrain the functional blocks in applications. At runtime, it dynamically allocates the fabric to tasks in terms of their performance and time constraints. Huang et al. [13] introduced self-adaptivity to a runtime task allocation approach. It optimizes for hardware efficiency, which means that tasks are mapped to their preferred PEs by dynamically adjusting a set of variables based on the current resource utilization. Singh et al. [33] presented communication aware runtime mapping heuristics on an MPSoC platform. These heuristics first check the available resources in each PE and decide to map tasks that directly communicate with the current task onto the same PE or the available nearby PE such that data transfer is minimized.

Schranzhofer et al. [32] proposed a novel methodology to compute a task-to-PE mapping based on the execution modes of target applications to minimize power consumption. At design time, this methodology precomputes the static mapping of tasks onto PEs for all possible execution modes. At runtime, it applies the mapping in order to adapt to the environmental variations. Piscitelli and Pimentel [30] presented a hybrid technique to help system-level design space exploration (DSE) to prune the number of states needed during DSE. It analyzes the expected throughput estimation of applications in terms of application-to-architecture mapping. In the meantime, simulation is also applied to examine the design points in order to make sure the DSE process is correct.

It is a compiler framework that makes program analysis lifelong and transparent by introducing IR as a common model for analysis, transformation, and synthesis [21], [31]. LLVM is a load/store architecture in which data transferred among registers, caches, and memory banks use only load and store instructions. There are several advantages using IR: 1) it is machine independent (portable) to avoid low-level actions such as register spilling and function prolog/epilog insertion and 2) it is language independent to represent high-level languages including C/C++ and build retargetable compilers.

Graph partitioning is an approach to divide the computations among processors, which is vital in parallel computing [11]. This is inspired by complex network theory where there is an increasing need to find community structures [28], clusters of densely connected nodes with sparse inter-community edges. The most popular method to detect communities is based on modularity [9]. Modularity can be described as a quality function Q for good partitioning of graphs into communities by comparing edge weights falling within communities with the corresponding weights in a random graph with the equivalent number of nodes [27]. The higher the modularity is, the better is the partitioning. Mathematically, modularity [9] is expressed as $$Q = \frac{1}{2m} \sum_{ij} (A_{ij} - P_{ij}) \delta(C_i, C_j)$$

where m is the total number of edges in a network; A is the adjacency matrix; $C_i$ is the community index for node i; $\delta(C_i, C_j)$ equals 1 if nodes i and j fall within the same community and 0 otherwise; P denotes the expected number of edges in a random graph with the same degree distribution as the graph to be analyzed. Therefore, CD is commonly used in complex networks to find communities or clusters, e.g., tweeters with similar interests in social networks.

Accordingly, there is still a need for systems that improve performance in heterogeneous hardware platforms.

SUMMARY

In at least one aspect, a self-optimizing and self-programming computing system (SOSPCS) framework, which overcomes the aforementioned drawbacks. SOSPCS provides flexibility, programmability, and performance/energy efficiency for heterogeneous systems is provided. Self-optimization and self-programmability are significant features in computing systems. It, at a low level, understands the dynamic nature of heterogeneous systems and, at a high level, creates and maps heterogeneous tasks to hardware [8], [14] without the needs of programmers to write domain-specific languages to utilize the hardware components fully. It also finds the optimal number and type of cores and HWAs in order to run applications in a domain such as machine learning. Therefore, in SOSPCS, at compile-time, SOSPCS first transforms target applications from low-level virtual machine (LLVM) intermediate representation (IR) instructions into instruction dependency graphs (IDGs) where nodes denote LLVM IR instructions; edges denote data dependencies; and edge weights denote the amount of data to be transferred between two dependent instructions. Second, the sliding window-based NN classifiers with three hidden layers (HLs) are trained offline by applying some standard applications in a domain such as MM, neurons, and ReLU activation function to make sure that the NNs can learn these special graph structures. The first NN determines the feature type, e.g., MM, neurons, or ReLU; on the other hand, the second decides the coordinates of each feature. Third, when new applications arrive, SOSPCS transforms them into IDGs and applies NNs to locate special structures and their specific types. Fourth, SOSPCSapplies community detection (CD) to partition the remaining graph into interconnected tasks with minimal data movement overhead. At runtime, RL is combined with task scheduling to implement distributed intelligent schedulers to map tasks onto either general CPUs/GPUs or domain-specific PEs. These schedulers obtain feedback from the hardware environment, such as the next state and the immediate reward formulated in terms of the types of tasks and availability of hardware components.

In general, SOSPCS integrates the concepts of software-defined hardware (SDH) and domain-specific system-on-chip (DSSoC). The SOSPCS system can reconfigure the hardware as specified in application requirements and translate high-level programs into tasks with application-specific hardware configurations by LLVM code that has the well-established interface with the existing OS. On the other hand, SOSPCS satisfies the requirements of DSSoC by having RL-based distributed intelligent schedulers to manage the set of domain resources required by applications and map each task created at compile time onto the appropriate PE [29].

In another aspect, SOSPCS provides the following novel contributions: 1) to address programming flexibility and fully exploit the underlying heterogeneous PEs (CPUs, GPUs, and HWAs), SOSPCS automatically partitions target applications in one domain into interdependent tasks with different PE affinities. Some tasks such as FFT prefer executing on accelerators, some such as for-loops prefer executing on GPUs, whereas the rest (e.g., general-purpose code) execute on CPUs and 2) runtime mapping is based on distributed RL to self-optimize the optimal policy under the environment variations.

In another aspect, community detection is modified to account for the computational and communication requirements and so the communities or clusters obtained by the SOSPCS algorithm will detect the high computation intensity, i.e., computations mostly done within a community without the need to fetch from another community.

In another aspect, SOSPCS provides flexible programmability by developing a compiler-based approach to profile high-level programs into universal machine codes and constructing the corresponding dynamic IDG from LLVM IR instructions.

In another aspect, SOSPCS provides hardware efficiency and reusability through an optimization framework for automatically identifying the optimal number and type of hardware resources to speed up the execution of applications (e.g., deep learning).

In another aspect, In another aspect, SOSPCS can translate high-level programs into LLVM IR and transform the IR trace into a graph representing the hardware constraints and resources.

In still another aspect, SOSPCS provides energy efficiency by minimizing the amount of messages among hardware resources to balance computation and communication.

In yet another aspect, SOSPCS allows multiple applications to be scheduled and run in parallel. Its learning-based engines are designed to easily incorporate any scheduling algorithm and learn application/task priority features. The hardware reconfigurability of the underlying DSSoC facilitates the consideration of application priority.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1:
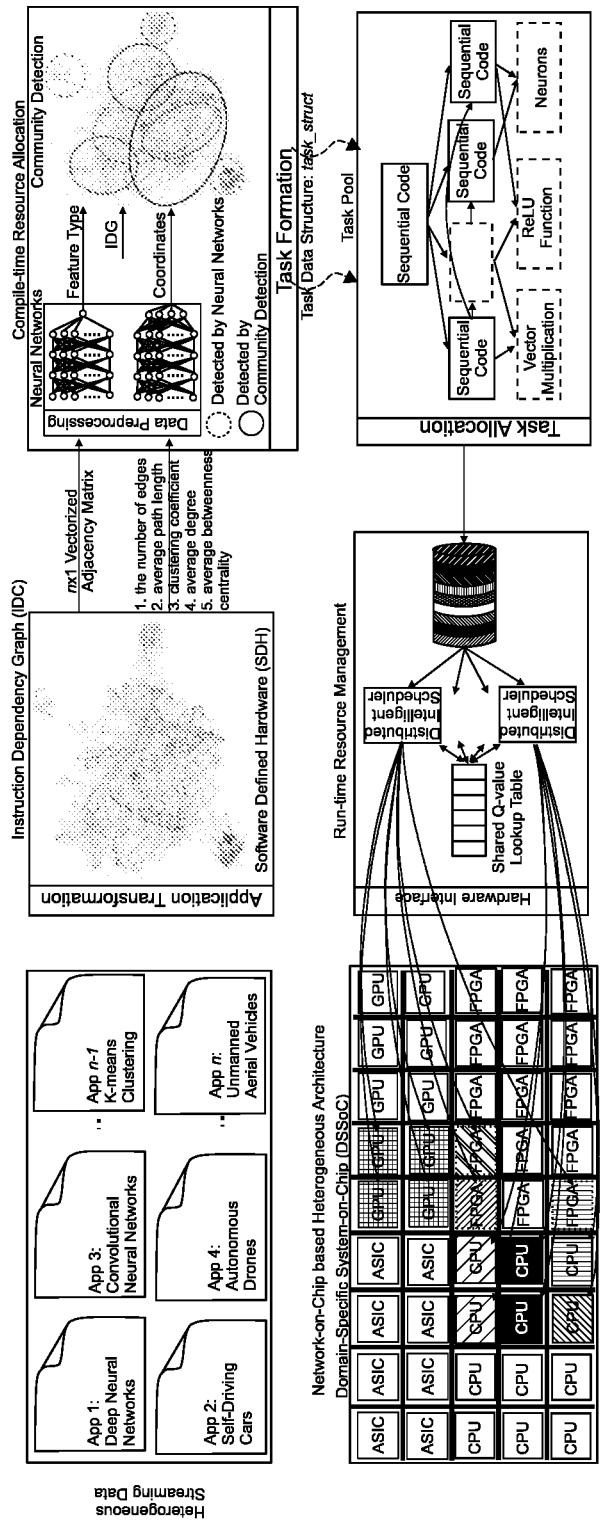
FIG. 1. Overview of SOSPCS framework. First, it transforms applications into an interacting graph to encode computation requirements and constraints. Second, it partitions the graph into different types of tasks and determines the corresponding task attributes via an AI/machine learning approach. Third, it maps tasks while reconfiguring the hardware platform by distributed intelligent schedulers (agents).

Reference will now be made in detail to presently preferred compositions, embodiments and method of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

The term "server" refers to any computer, computing device, mobile phone, desktop computer, notebook computer or laptop computer, distributed system, blade, gateway, switch, processing device, or a combination thereof adapted to perform the methods and functions set forth herein.

The term "computing device" generally refers to any device that can perform at least one function, including communicating with another computing device.

The term "computing system" refers to one or more computing devices operating in concert on a problem.

When a computing device is described as performing an action or method step, it is understood that the computing device is operable to perform the action or method step typically by executing one or more line of source code. The actions or method steps can be encoded onto non-transitory memory (e.g., hard drives, optical drive, flash drives, and the like).

Abbreviations

"BP" means backpropagation.
"CD" means community detection.
"CNN" means convolutional neural net.
"CPU" means central processing unit.
"DSE" means design space exploration.
"DSSoC" means domain-specific system-on-chip.
"FFT" means fast Fourier transform.
"GPA" means graphics processing unit.
"HL" means hidden layer.
"HWA" means hardware accelerator.
"IDG" means an instruction dependency graph.
"IR" means intermediate representation.
"KM" means K-means.
"KPN" means Kahn process network.
"LLVM" means low-level virtual machine.
"LR" means logistic regression.
"MG" means modularity gains.
"MM" means matrix multiplication.
"MPSoCs" means multiprocessor system-on-chips.
"NB" means naïve Bayes.
"NN" means neural network.
"PCA" means principal component analysis.
"PE" means processing element.
"RL" means reinforced learning.
"SOSPCS" means self-optimizing and self-programming computing system.
"SDH" means software-defined hardware.
"SVM" support vector machine.
"TPU" means tensor processing unit.

With reference to FIG. 1, a method executed by a self-optimizing and self-programming computing system is illustrated. The method includes a step of transforming a target application at compile time from low-level virtual machine intermediate representation instructions into an instruction dependency graph with one or more trained neural network classifiers. In this regard, the instruction dependency graph includes nodes that denote low-level virtual machine intermediate representation instructions, edges that denote data dependencies, and edge weights that denote an amount of data to be transferred between two dependent instructions. The one or more trained neural network classifiers are applied to identify first partitions in the instruction dependency graph having predefined programming features. Sometimes as used herein, "programming features" are referred to as 16 mixed or heterogeneous features. Community detection is applied by the self-optimizing and self-programming computing system to identify remaining partition of in the instruction dependency graph having clusters and or tasks with minimized data communication. Finally, at runtime, heterogeneous tasks are mapped to hardware by distributed intelligent schedulers to fully utilize hardware components in a heterogeneous hardware platform such that performance is maximized. It should also be appreciated that these tasks can be interdependent and can have different processing element affinities. Characteristically, the distributed intelligent schedulers mapping tasks onto either general CPUs, graphics processing units, or domain-specific programming elements. An exemplary heterogeneous hardware platform is a network on a chip. Characteristically, the mapping step can be implemented without programmers writing domain-specific languages. In a refinement, the number of clusters generated is constrained to be approximately equal to the number of CPUs in the heterogeneous hardware platform. It should be appreciated that the learning-based engines are designed to easily incorporate any scheduling algorithm and learn application/task priority features. Moreover, hardware reconfigurability of the underlying heterogeneous hardware platform (e.g. network on a chip) facilitates consideration of application priority. Additional details about the system are found in Y. Xiao, S. Nazarian and P. Bogdan, "Self-Optimizing and Self-Programming Computing Systems: A Combined Compiler, Complex Networks, and Machine Learning Approach," in *IEEE Transactions on Very Large Scale Integration (VLSI) Systems*, vol. 27, no. 6, pp. 1416-1427, June 2019; the entire disclosure of which is hereby incorporated by reference.

Advantageously, the self-optimizing and self-programming computing system is operable to automatically identifies an optimal number and type of hardware resources to be assigned to tasks to speed up execution of applications as compared to a system not implement the methods of the self-optimizing and self-programming computing system. Moreover, the self-optimizing and self-programming computing system is also operable to minimize the number of messages among hardware resources to balance computation and communication. In a refinement, the self-optimizing and self-programming computing system is operable is operable to allow multiple applications to be scheduled and run in parallel.

In a variation, the predefined programming features represent specific types of programming methods (e.g., sequences of program instruction implementing a flow control statement) or specialized functions. Examples of a programming features include, but are not limited to loops for CPUs; loops for GPUs; neurons in a neural network, activation functions, matrix multiplications, vector multiplication, gradient descent, for-loops in a machine learning domain, fast Fourier transforms, matrix multiplication, and combinations thereof. In a refinement, fast Fourier transforms and matrix multiplication are mapped to hardware accelerators and "for-loops" are mapped to graphics processing units with remaining tasks are mapped to central processing units. Typically, the target application has at least two predefined programming features.

In another variation, the one or more trained neural network classifiers are trained with sample programs having the predefined programming features. Typically, one or more trained neural network classifiers have a predetermined number of hidden layers (e.g. 1, 2, 3, 4, 5, 6, 7, 8 or more hidden layers). In a refinement, the one or more trained neural network classifiers include sliding window-based neural network classifiers. In a further refinement, a first neural network and a second neural network are applied to a sliding window, the first neural network determining a predetermined programming feature type and the second neural network determining coordinates of each predetermined programming feature.

In another variation, principal component analysis is applied to neural network inputs to reduce the number of dimensions. Moreover, inputs can be normalized to obtain a normalized input by mean normalization is applied as $\mu_j = (1/m)\Sigma_{i=1}^{m} x_j^{(i)}$ where $x^{(i)}$ is an $i^{th}$ vector with $j^{th}$ input to the one or more trained neural networks classifiers, and $u_j$ is the normalized input. In a refinement, after applying principal component analysis to reduce dimension and preserve main components, the self-optimizing and self-programming computing system is operable to drive a vectorized adjacency matrix, along with a normalized number of edges, average path length, clustering coefficient, average degree, and average betweenness centrality into neural networks.

Another aspect of the present embodiment, is the proper training of the neural network classifiers. In this regard, the one or more trained neural network classifiers are trained by collecting a group of training applications with different features. Examples of such different features include, but are not limited to, loops for CPUs; loops for GPUs; neurons in a neural network, activation functions, matrix multiplications, vector multiplication, gradient descent, for-loops in a machine learning domain, fast Fourier transforms, matrix multiplication, and combinations thereof. Clearly, the target application is from a same domain as those in the group of training applications. In other words, the training application includes the programming features that are in the target applications being analyzed.

As set forth herein, the neural network classifiers are implemented to construct instruction dependency graph from a target application having a plurality of programming instructions. In a variation, the self-optimizing and self-programming computing system is operable to construct such instruction dependency graphs as follows. The self-optimizing and self-programming computing system is operable to executes the target application to collect dynamic intermediate representation traces and to analyze the dynamic intermediate representation traces to determine whether source registers of a current instruction depend on destination registers of the previous instructions such that if data dependencies exist, edges are inserted in between instruction nodes. The self-optimizing and self-programming computing system is further operable to profiles the instructions to determine data size as edge weights in the instruction dependency graph. It should be appreciated that this method for constructing the instruction dependency graphs combines static and dynamic program analysis as set forth below in more detail.

In a variation, the distributed intelligent schedulers receive feedback from the heterogeneous hardware platform, the feedback including a next state and an immediate reward formulated in terms of types of tasks and availability of hardware components. As set forth below in more detail, the distributed intelligent schedulers observe a set of environment states S and executes a set of actions A such that actions represent mapping of tasks onto one type of programming elements in task pools and wherein a probability of selecting an action under a state is called policy $\pi(s, a) = P(a_t = a | s_t = s)$. Characteristically, the distributed intelligent schedulers give a negative reward to prevent an action of assigning a task to a busy processing element wherein if a target processing element is busy the task is migrated to a nearby processing element with a cost of network congestion and latency.

Additional details of the invention are set forth in Y. Xiao, S. Nazarian and P. Bogdan, "Self-Optimizing and Self-Programming Computing Systems: A Combined Compiler, Complex Networks, and Machine Learning Approach," in IEEE Transactions on Very Large Scale Integration (VLSI) Systems, vol. 27, no. 6, pp. 1416-1427, June 2019, doi: 10.1109/TVLSI.2019.2897650; the entire disclosure of which is hereby incorporated by reference.

The following analysis and examples illustrate the various embodiments of the present invention. Those skilled in the art will recognize many variations that are within the spirit of the present invention and scope of the claims.

I. Graph Theoretical Models

The following definitions are provided with respect to the SOSPCS framework:

Definition 1: An IDG is defined as a directed acyclic graph (DAG) $\mathcal{IDG}$ $(n_i^I, e_{ij}^I, \omega_{ij}^I | i, j \in \{1, \ldots, N^I\}$ where nodes $n_i^I$ represent LLVM IR instructions, edges $e_{ij}^I$ represent data dependencies between two instructions, and edge weights $\omega_{ij}^I$ represent the amount of data to be transferred.

Definition 2: A task is defined as a DAG $\mathcal{T}$ $(n_i^I, e_{ij}^I, \omega_{ij}^I, type^T | i, j \in \{1, \ldots, N^T\}$, $type^T \in \{seq, par, func \ldots\}$ where nodes $n_i^I$ represent IR instructions, edges $e_{ij}^I$ represent data dependencies, and edge weights $\omega_{ij}^I$ represent the amount of data to be transferred. Note that $\mathcal{T} \subseteq \mathcal{IDG}$. In addition, each task has its own attribute $type^T$ representing the execution affinity. For example, a task with loops ($type^T$=par) is more beneficial to be executed in GPUs rather than CPUs. A task with MM ($type^T$=mm) can be executed in HWAs to gain the best performance.

Definition 3: A task pool is defined as a DAG $\mathcal{TP}$ $(n_i^I, e_{ij}^I | i, j \in \{1, \ldots, N\}$, $type^T \in \{seq, par, func \ldots\}$ where node represent tasks $\mathcal{T}_i$ and edges represent messages to be transferred among tasks. Note that $\mathcal{TP} = \mathcal{T}_1, \ldots, \mathcal{T}_1 = \mathcal{IDG}$.

Definition 4: An architecture graph with a heterogeneous NoC of dimensions X and Y is defined as an undirected graph $\mathcal{NoC}$ ($pe_{xy}$, $busy_{xy}$, $type_{xy}^{NoC}$, $l_{ij}$, $b\omega_{ij}^{max}$ | $0<x<X$, $0<y<Y$, $\{i,j\} \in pe$, $busy_{xy} \in \{0,1\}$, $type_{xy}^{NoC} \in \{CPU, GPU, HWAs\}$) where each node $pe_{xy}$ represents a PE at position (x, y) with types of CPU, GPU, or various specialized HWAs such as FFT and MM. $busy_{xy}$ models the availability of a given PE $pe_{xy}$ with 1 being not available. Furthermore, each communication link $l_{ij}$ has a maximum bandwidth $b\omega_{ij}^{max}$.

Note that each task has preferred execution affinity. Therefore, in order to improve performance, tasks should be mapped to their most beneficial PEs. For example, a task with loops ($type^T$=par) should be mapped to GPU ($type_{xy}^{NoC}$=GPU) in order to improve performance whereas a task with a convolutional layer ($type^T$=conv) cannot be mapped to special HWAs for MM ($type_{xy}^{NoC}$=mm).

The SOSPCS framework solves the following problem: Given an architecture graph NoC and target applications, 1) find a partition P of IDG to detect tasks with common features: $\mathcal{P}(\mathcal{IDG}) = \mathcal{TP}$ (type=fft, mm, par, ser, ...) and 2) find a mapping $\mathcal{M}$ of $\mathcal{TP}$ to PEs such that performance is maximized: $\mathcal{M}(\mathcal{TP}) = \mathcal{NoC}$.

II. SOSPCS Optimization Framework

The software implementation of SOSPCS is described in four steps as illustrated in FIG. 1, namely, application transformation, NN classifiers, CD (all three of which performed at compile time), and runtime resource management. At compile time, SOSPCS transforms applications into a complex graph and determines the types and locations of special features existed in the graph by NN classifiers. During training, sample applications are driven into the networks to learn specific features. Machine learning applications contain code regions that may be sequential or have loops, vector/MM, different kinds of activation functions (sigmoid or ReLU), and gradient descent. After training, these networks have the capability to mine hidden structures in new to identify complicated applications with at least two mixed features. Next, SOSPCS applies the CD approach to partition the rest of the graph into interdependent clusters/tasks with minimized data communication. At runtime, resources are managed by using RL-based distributed intelligent schedulers to explore the best locations onto which heterogeneous tasks should be mapped (i.e., tasks with loops are mapped to GPUs, whereas tasks with FFT or MM features should be mapped to specialized HWAs).

A. Compile Time: Resource Allocation

The objective is to find a partition function that separates one application into tasks with various functionalities such as loops, FFT, and MM to exploit the underlying heterogeneous NoC-based hardware platform. Therefore, NNs are applied first to find and detect the special features existing deep in applications. Next, SOSPCS applies a modularity-based CD inspired approach to partition the remaining graph into clusters or tasks with minimal data movements. Therefore, similar to SDH, SOSPCS has the ability to translate high-level programs into LLVM IR and transform the IR trace into a graph representing the hardware constraints and resources.

Although modularity-based CD can partition the graph into several tasks with minimal inter-task data transfers, NNs are relied on to further guide the partitioning of the graph into tasks with the common features (that are learned offline such as loops and MM) because the CD may not find such patterns.

1) *Application Transformation:* Target applications are modeled by constructing the corresponding IDG [41]. First, the applications are executed to collect dynamic LLVM IR traces. Second, the traces are analyzed to figure out whether source registers of the current instruction depend on destination registers of the previous instructions. If data dependencies exist edges are inserted in between. Third, these instructions are profiled to get the precise data size as edge weights in $\mathcal{IDG}$. Therefore, the SOSPCS approach combines static and dynamic program analysis. Static analysis means that program data dependency analysis is performed to construct the graph. Dynamic analysis means that applications are run with representative inputs to get the dynamic IR traces because memory dependencies cannot be resolved statically.

For example, a part of dynamic traces has been listed as follows.
Listing 1. LLVM trace example
1 %5=or %2, %3;
2 %6=add %2, %5;
3 %7=mul %5,%6;
Since the second instruction has the register %5, which depends on the destination register %5 of the previous instruction, a dependency is found between the first two instructions. Similarly, the source registers (%5 and %6) of the third instruction depend on the destination registers of the previous two instructions. The time complexity of application transformation is O(N log D) where N is the number of IR instructions, and D is the number of different destination registers. O(N) indicates that each IR instruction is linearly fetched to analyze its dependencies. O(log D) represents that dependency analysis searches a given source register in a list of destination registers. Therefore, the total time complexity is O(N log D). However, note that D is much smaller than N.

Figure 2:
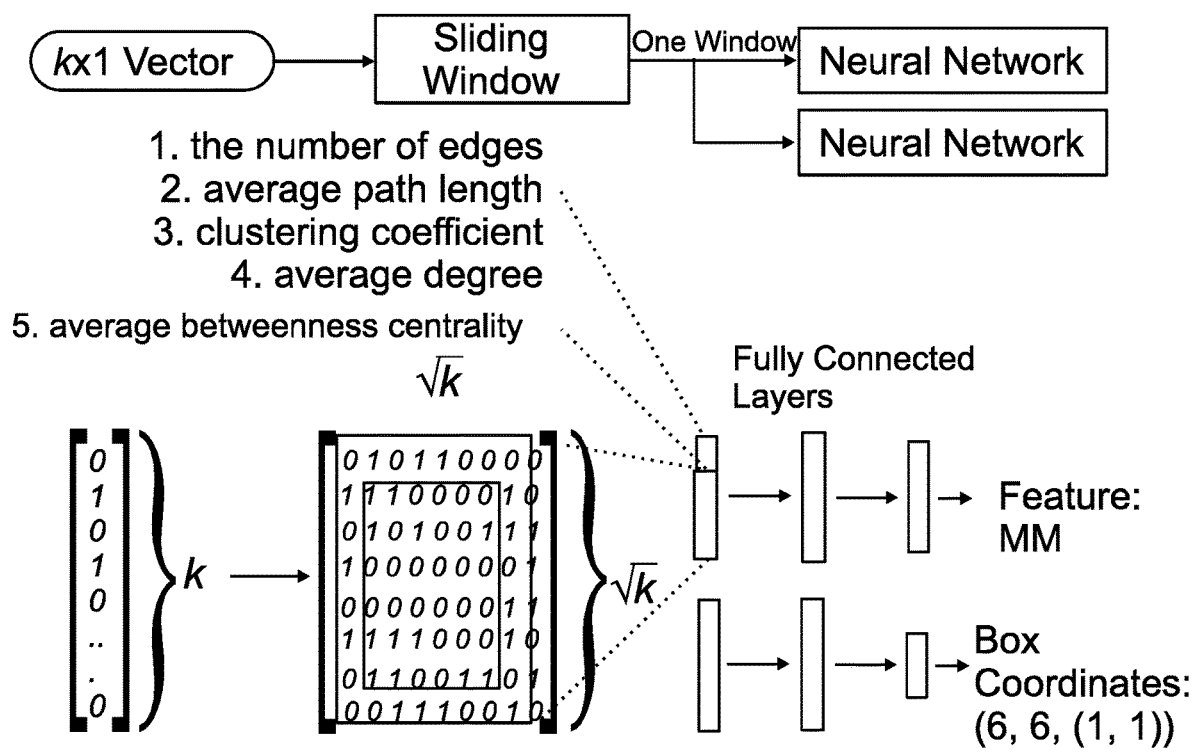
FIG. 2. NN classifiers. One NN is used to identify a feature within a sliding window in red. The other NN predicts the exact location of the feature in the window, which helps extract the special pattern out of the graph. For example, the sliding window in red has the "MM" pattern, and its corresponding location in blue is [6, 6, (1, 1)], which means that the height of the box is 6, the width is 6, the location of its upper left corner is (1, 1).

2) *NN Classifiers:* In order to detect specialized features such as FFT and MM in applications, it is difficult for any partitioning scheme to cut the graph into several sub-graphs representing functionalities. Therefore, NN classifiers are adopted to first offline learn the structures of numerous features in a specific domain such as signal processing (FFT, compression) and deep learning (MM, SGD); and then identify the topology of the existing features given new applications.

a) *NN architecture:* SOSPCS applies two NNs to identify the type and location of special features in a complex graph. The first NN predicts the types of special features such as loops, MM, and FFT existed in the graph. Other NNs predict the box coordinates, i.e., the height and width of the box and the location of its upper left corner. The coordinates are used to determine the exact location of the special features in application graphs. The number of neurons in the input layer for two NNs is k+5 where k is the vector dimension, and 5 denotes the number of additional graph attributes consisting of the number of edges, average path length, clustering coefficient, average degree, and average betweenness centrality shown in FIG. 2. The number of neurons in the output layer is one and four representing the feature index and coordinates, respectively. Three HLs are chosen as indicated below.

b) *Data preprocessing:* In order to correctly identify special features in a graph, SOSPCS preprocesses input data-driven to two NNs. In this regard, the number of input neurons cannot be dynamically adjusted to accommodate to accelerating with the varying number of nodes. Note that input data have an impact on the number of iterations in applications, leading to a different number of nodes in graphs $\mathcal{IDG}$. Therefore, a sliding window is applied in NNs to make sure that the number of input neurons is static and equal to the size of the sliding window. It is possible that due to the enormous number of iterations in features such as MM, the sliding window with a fixed size cannot detect the exact features. Hence, some unnecessary dimensions might be removed to detect the features with high probability $\beta$. Principal component analysis (PCA) is an approach to compress a set of observations with i dimensions to a set of linearly uncorrelated variables with k dimensions (k<n), which are called principal components. Inputs such as the number of edges and average path length have different scales. For example, the number of edges may vary from hundreds to millions, whereas the average path length may be in the range of tens to hundreds. Inputs are scaled via mean normalization: $\mu_j=(1/m)\Sigma_{i=1}^{m}x_j^{(i)}$ where $x^{(i)}$ is the $i^{th}$ vectors with $j^{th}$ input to the NNs. Note that only properties associated with the graph such as clustering coefficient are normalized and not the vectorized adjacency matrix representing the structure of the application graph.

c) *Inputs to NNs:* After applying PCA to reduce the dimension and preserve the main components, SOSPCS drives the vectorized adjacency matrix, along with the normalized number of edges, average path length, clustering coefficient, average degree, and average betweenness centrality into NNs.

d) *Outputs to NNs:* NNs return feature index and coordinates. This feature index determines the task attribute in Definition 2 and runtime intelligent schedulers require this attribute to decide the mapping and possible reconfiguration of the hardware components. It is determined by the output of the first NN. The coordinates indicate the location and size of each special feature such as FFT and MM. For example, identifying an object in an image requires coordinates to determine the location and size of each object. Similarly, coordinates are necessary to locate features in a large graph. FIG. 2 shows an example of coordinates. The location of the blue box is [6, 6, (1, 1)], which means that the height and width of the box are 6 and 6, and the location of its upper left corner is (1, 1). Its type, suggested by the first NN, is MM.

e) Training data preparation: During training, a group of applications with different features is collected. These are written as follows: 1) without loops for CPUs; 2) with loops for GPUs; or 3) with one feature such as neurons, different types of activation functions (sigmoid and ReLU), matrix/vector multiplication, gradient descent, various for-loops in a machine learning domain. These applications are written in C in separate files in order to be ready for SOSPCS to be transformed into an interacting graph. The task attributes for these applications are known in advance so that the correct feature index can be assigned during data preparation.

f) New arriving applications: During testing and simulation, unknown applications are used but from the same domain as those in the training test benches, e.g., machine learning applications. These applications are listed in Table I. These applications have at least two mixed features mentioned above to be able to test the validity of SOSPCS. When new applications arrive, it is first transformed into IDGs. Based on the graphs and their metrics, input data for NNs is prepared, which is then driven into NNs. The first trained NN figures out the types of special features. For example, if the target domain is deep learning, special features contain MM, ReLU, neurons, and so on. It is necessary to identify these features so that they can be reconfigured onto a field-programmable gate array or map them onto the application-specified integrated circuit instead of executing on CPUs. The second NN determines the exact locations and types of features in a graph if they exist.

g) Prediction accuracy: The accuracy of the prediction and application performance while varying the number of HLs and the impact of misclassification is demonstrated below. Based on the results, it is decided to implement NNs with three HLs.

3) Graph Partitioning: After detecting special features in a $\mathcal{IDG}$, SOSPCS partitions the remaining graph into tasks (type$^T$=seq) to: 1) obtain better parallelism in CPUs and 2) minimize data communication overhead to reduce NoC latency and improve performance. Hence, SOSPCS applies CD [41] to partition the remaining graph $\mathcal{IDG}\backslash\mathcal{IDG}^{NN}$ produced by application transformation into densely interconnected tasks such that data communications among tasks are minimal. Given a weighted graph $\mathcal{G}$ ($n_i$, $e_{ij}$, $\omega_{ij}|i$, $j \in \{1, \ldots, |N|\}$), modularity Q with an adjustable number of tasks is defined as $$Q = \sum_{i=1}^{n_c} \left[ \frac{W^{(i)}}{W} - \left(\frac{S^{(i)}}{2W}\right)^2 \right] - \frac{\gamma|n_c - N|}{n_c} \quad (1)$$

where $n_c$ is the number of partitioned communities; N is the number of available CPUs; γ represents the regularization parameter; $W^{(i)}$ represents the sum of edge weights connected within community i ($W^{(i)} = \sum^{i \in c} \sum^{k \in i} \omega_{jk}$); W denotes the sum of weights of all edges ($W = \sum_i \sum_j \omega_{jk}$); and $S^{(i)}$ denotes the sum of all weights adjacent to community i.

The partitioning problem is defined as follows: given an $\mathcal{IDG}$ find nonoverlapping communities such that the quality function Q in (1) is maximized.

According to (1), ($W^{(i)}/W$) represents the ratio of the total edge weights within community i, whereas ($S^{(i)}/2W$) measures the ratio of the weights adjacent to the community representing the amount of data to be communicated to other communities. Therefore, SOSPCS tries to maximize the intracommunity weights and minimize the intercommunity weights. For the second term, the number of clusters generated from the model is constrained to be approximately the same as the number of CPUs.

Inspired by the algorithm discussed in [2] from complex network literature, Algorithm 1 is proposed to detect communities. The basic idea is that a pass is repeated until there are no more modularity gains (MGs) in the network. In one pass, a cluster i is randomly chosen as a base case, and MGs when adding the neighbors into cluster i one at a time are calculated. Also during this single pass, the clusters with the highest MG are selected and combined into one cluster until there are no MGs.

| Algorithm 1 Iterative Approximated CD Algorithm |
| --- |
| Input: A remaining dependency graph $\mathcal{IDG}\backslash\mathcal{IDG}^{NN}$ |
| Output: A task pool $\mathcal{TP}$ |
| 1:     Start with each node as a singleton cluster |
| 2:     repeat |
| 3:         bestMG = 0, currMG = 0, bestC = ∅ |
| 4:         Randomly choose a cluster i |
| 5:         for C ∈ Neighbor(i) do |
| 6:             if (currMG = ModGain(i, C)) > bestMG then |
| 7:                 bestMG = currMG, bestC = C |
| 8:             end if |
| 9:         end for |
| 10:        Combine clusters bestC and i into one cluster |
| 11:    until There are no modularity gains |

Figure 3A:
FIGS. 3A and 3B. IDGs. (A) FFT. (B) Signal processing application.
Figure 3B:
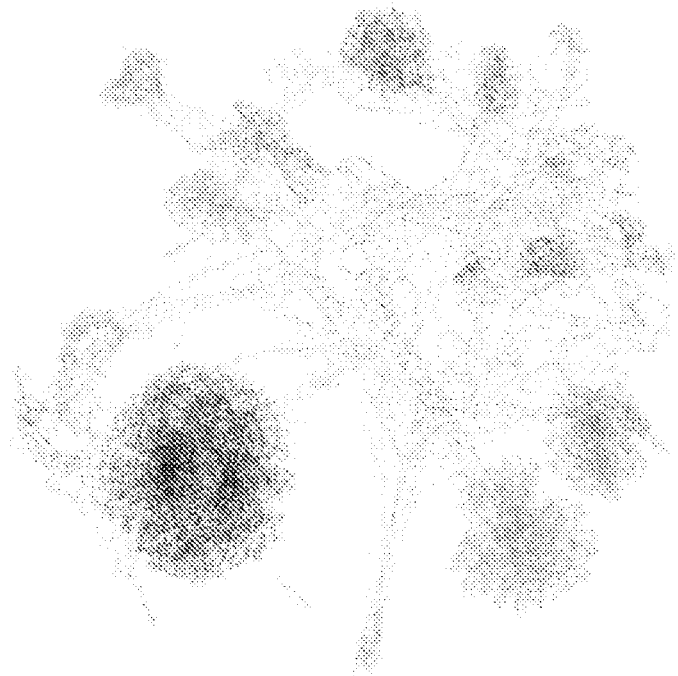

FIG. 3(B) shows the structure of the graph for a signal processing application, including the FFT functionality and a sequential program with loops. Nodes of the same color represent computations within a task. Therefore, it is observed that SOSPCS has created the task pool to be consumed by the runtime system.

B. Runtime: Resource Management

Figure 4:
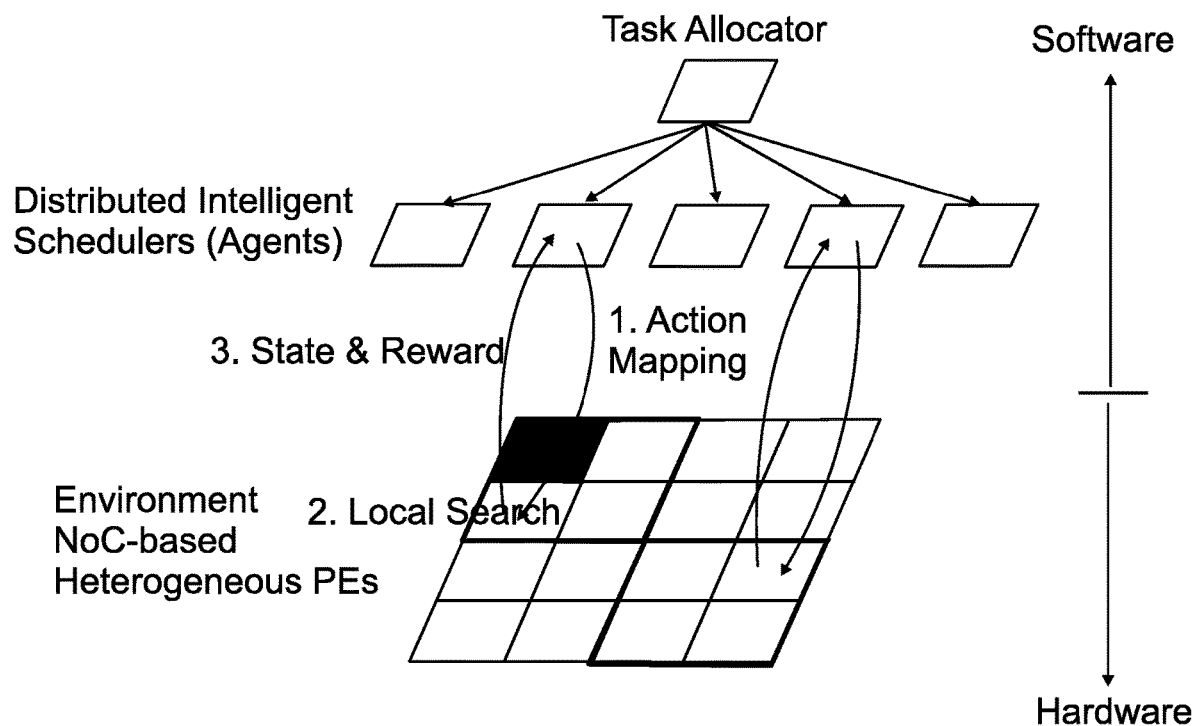
FIG. 4. Runtime resource management. First, the task allocator maps tasks into distributed intelligent schedulers (agents) with a goal of load balancing across different agents. Next, agents take actions by mapping tasks onto NoC-based heterogeneous PEs and reconfiguring the hardware components. They receive feedback such as rewards and the next state from the environment. If the PE to which a task is mapped is occupied, a local search is performed to find and migrate to the nearby available PE suitable for the task.

In this section, the objective is to find a mapping M to schedule tasks onto PEs such that performance is maximized. However, to gain the maximum speedup, ideally, the following criteria have to be satisfied: 1) the types of tasks should match with the types of PEs to which the tasks are mapped: type$^T$=type$_{xy}^{NoC}$ and 2) data communications among PEs have to be minimal by putting PEs that directly communicate with each other close enough. Traditional static task mapping ignores the dynamic nature of the underlying hardware platforms such as traffic in NoC and availability of cores. For example, in FIG. 4, two dependent tasks could be mapped to the blue region if there exists traffic congestion in the red region. Learning is a better approach to deal with these uncertain situations in multicore platforms. Also, streaming and steering computations have to work with the heterogeneous data streams, making simple heuristics difficult to solve all possible cases [10]. Therefore, distributed RL-based intelligent schedulers are designed to map tasks to the best suitable PEs. There are two advantages: 1) the technique learns and self-optimizes the mapping of tasks onto heterogeneous systems to gain the optimal performance and 2) it is dynamic, meaning that at runtime, based on the states of the environment and immediate rewards, agents decide the best policies for task mapping. Therefore, SOSPCS satisfies the requirements of SDH and DSSoC by having distributed intelligent schedulers to manage the set of domain-specific tasks and enable reconfiguration of hardware components.

1) Task Scheduling: The scheduling of tasks into agents is modeled as a balls-into-bins problem and provide a theoretical upper bound for loads in each agent to make sure loads are somewhat balanced among agents. A balls-into-bins problem can be described as the processing throwing n balls into n bins. Each ball is thrown into a uniformly random bin, regardless of the other balls. Therefore, the probability that a ball falls into any given bin is (1/n). It is proven that the maximum loaded bin has (3 log n/log log n) balls with high probability, i.e., (1−1/n). However, loads among bins can be made even more balanced by the power of two choices: randomly choose two bins and throw a ball into the bin with the least number of balls. With probability of at least [1−O(log 2 n/n)], it gives a maximum load of (ln ln n/ln2+O(1)).

However, in the settings used, agents constantly remove tasks (balls) from the input queues (bins) and map them onto NoC, which is different from the balls-into-bins problem. In order to balance the load among agents, it is necessary to measure the rate of task scheduling instead of the current number of tasks in agents. Therefore, in the SOSPCS implementation, two agents are randomly picked and the rates of task scheduling $(N'_{task}{}^i - N_{task}{}^i)$ where $N'_{task}{}^i, N_{task}{}^i$ represent the number of tasks measured last time and this time in the agent i is calculated, respectively. If the agent i has a higher rate, the current task is scheduled to it.

2) Distributed RL: RL is an area of machine learning, developed to find an optimal solution in different areas, including control theory. It is inspired by human trial-and-error experiments in order to learn the optimal policy under all circumstances. In RL, the agent takes actions and interacts with an environment in order to maximize cumulative results. The basic environment is modeled as a Markov decision process (MDP) with the following considerations:

1) A set of environment states S observed by the agent. As used herein, states represent the availability and type of PEs in NoC.

2) A set of actions A of the agent. As used herein, actions represent the mapping of tasks onto one type of PEs in task pools $\mathcal{TP}$. The probability of selecting an action under a state is called policy $\pi(s, a) = P(a_t = a | s_t = s)$.

3) The probability of a transition from the state s to another state s' under an action a: $P(s_{t+1} = s' | s_t = s, a_t = a) = P_a(s, s')$. Agents give a large negative reward to prevent the action of assigning a task to a busy PE. However, during exploration, these assignments are not forbidden. If the target PE to which a task is mapped is busy in serving the current request, a local search [3] is performed by migrating the task to the nearby PE with a cost of network congestion and latency.

4) The immediate reward $r_a(s, s')$ after a transition from the state s to another state s' with action a.

The immediate reward is a technique to inform an agent whether the action a from s to sis perfect. High rewards are given when mapping tasks onto PE with the same type and penalize the mapping of tasks onto occupied PEs. Therefore, the reward function is formulated as follows:

$$r^a = \begin{cases} r(type^T, type_{xy}^{NoC})_{,curr} & \text{if } busy_{xy} = 0 \\ -\theta l_1(src, dest) \frac{bw_{xy}^{curr}}{bw_{xy}^{max}}, & \text{otherwise} \end{cases} \quad (2)$$

$$r(t_1, t_2) = \begin{cases} \text{negative reward,} & \text{if } t_1 \text{ dependency exits} \\ \text{high reward,} & \text{if } t_1 \text{ matches } t_2 \\ \text{low reward,} & \text{if } t_1 \text{ executes in } t_2 \end{cases} \quad (3)$$

where $r_a$ returns a high reward (100) when $type^T$ matches $type_{xy}^{NoC}$, a low but still positive reward (10) when the task with $type^T$ can be executed in the PE with $type_{xy}^{NoC}$, and a negative reward proportional to communication costs if dependency exists. For example, it is tolerable to have a mapping of for-loops onto CPUs instead of GPUs (in this case, the reward is 10), whereas a mapping of for-loops onto HWAs is strictly forbidden. Otherwise, the task requires a certain bandwidth to be migrated to a nearby available PE. Therefore, it returns a large negative reward if the task cannot be executed, depending on the current bandwidth $bw_{xy}^{cur}$, the maximum bandwidth $bw_{xy}^{max}$, and the l1 distance due to migration. If network congestion occurs, $bw_{xy}^{curr} \geq bw_{xy}^{max}$ and the reward is negative. $busy_{xy}$ equals 1 if the PE at location (x, y) is occupied and 0 otherwise. If $busy_{xy}$ equals 0, then NoC communication has to be considered to reduce the number of hops for messages. Therefore, in (3), the existence of task dependencies indicates NoC communication. The amount of communication messages are relied on in the graph partitioning algorithm. θ is a parameter to show how much to penalize the incorrect mappings. $l_1(p_1, p_2) = |p1_x − p2_x| + |p1_y − p2_y|$ is the l1 distance between two points p1 and p2.

The long-term reward starting from time t is defined as $R_t = r_t^a + \gamma r_{t+1}^a + \ldots \Sigma_{i=0}^{\infty} \gamma^i r_{t+1}^a$ where $r_t^a$ is an immediate reward after action a at time t and γ is a discount factor to represent that the future reward decays at the factor of γ. If γ=1, the future reward is as important as the current reward.

Q-learning is used to find an optimal policy which the agent follows in selecting actions for any MDP. Q(s, a), the expected utility of taking an action a in a state s, can be learned by following policies π given the state. It is one of the most important algorithms in RL because it does not require building explicit representations of the transition $P_a(s, s')$ and the expected reward in MDP and it converges to the optimal solution of the Bellman equation which is formulated as $$Q(s,a) = R(s,a) + \gamma \Sigma_{s'} P_a(s,s') \max_{a'} Q(s',a') \quad (4)$$

At times, the system may not be aware of the transition $P_a(s, s)$ and the expected reward R(s, a). Therefore, it is of great importance to apply incremental updates with the current state s, the next state s', the action a, and the immediate reward $r_a(s, s')$ to approximate (3) as $$Q(s,a) \leftarrow Q(s,a) + \alpha[r + \gamma \max_{a'} Q(s',a') - Q(s,a)] \quad (5)$$

where $\alpha \in [0, 1]$ is the learning rate.

Once Q value is updated, equation (4) can be followed to get the optimal action $a' = \text{argmax}_a Q(s, a)$. However, keeping choosing the optimal action a* for updated Q value can cause overexploitation, which might lead to local optimum. Therefore, agents should keep exploitation and exploration balanced in order to find a globally optimal action. If agents only explore the environment, they just randomly try to perform actions without learning the optimal Q value. If agents only exploit the environment based on the current Q-learning, they have a chance to be stuck in a local optimum without trying to explore the global optimum. To strike a balance between exploitation and exploration, an effective ∈-greedy action selection algorithm [36] is implemented herein. The agent with a small probability ∈ randomly picks a PE to which the task is mapped (line 8 in Algorithm 2) to explore the possible mapping. With high probability 1–∈, the agent chooses a PE based on the Q value. In the SOSPCS implementation, ∈ is set to be 0.1, which guarantees that agents keep trying new actions for each state (exploration) while following the optimal action according to the Q values (exploitation).

Therefore, a distributed Q-learning algorithm is provided where multiple agents interact with environment independently (line 2 in Algorithm 2) by mapping tasks assigned by the task schedulers onto suitable PEs. If one PE is occupied by another task, a local search is performed by selecting the available PE nearby with the least number of flits (lines 15-17 in Algorithm 2). At the same time, all agents can get access to the shared Q values and update them accordingly after receiving rewards from the environment (line 21 in Algorithm 2). However, since Q values are shared among all agents, it should be ensured that they are up-to-date when agents are about to modify Q values. Therefore, Q value updates should be protected by a critical section, which means that only one agent can get access at a time. Performance may suffer, but it guarantees a better convergence of Q values.

---

Algorithm 2 Distributed Q-Learning of the Best Mapping

---

Input: Task queues in agents and the architectural graph $(\mathcal{N}, \mathcal{C})$
1: Initialize $Q$
2: parallel for each agent i do
3:     Initialize time $t_i = 0$ and states $s_i$, 0
4:     repeat
5:         task = pop(InputTaskQueue[i])
6:         /* ∈-greedy algorithm */
7:         rand = randnum(0, 1)
8:         if (rand < ∈) do randomly choose a PE
9:         else choose a PE based on Q values
10:        endif
11:        /* local search */
12:        if(busy$^{PE}$ == 1)
13:           search a nearby PE' with the least number of flits
14:        endif
15:        $s_{i,\,ti+1}$ = mapping(task, PE)
16:        calculate r using the equation (2)
17:        critical section do
18:           $Q(s_{i,ti}, \alpha_{i,ti}) = Q(s_{i,ti}, \alpha_{i,ti}) + \alpha[r + \gamma \max_{\alpha'} Q(s_{i,ti+1}, \alpha') - Q(s_{i,ti}, \alpha_{i,ti})]$
19:        end
20:        $t_i = t_i + 1$
21:     until Q values converge
22:   22: endfor

---

Simulation Results

In this section, the benefits of SOSPCS is evaluated with a set of machine learning algorithms (see Table I) to demonstrate the performance improvement. These algorithms are written without using Pthreads or OpenMP (1SOSPCS automatically parallelizes the sequential programs without the need to insert pragmas are processed by SOSPCS to obtain their IDGs). The experimental results are compared with state-of-the-art HETS scheduling [26], and METIS graph partitioning [18] approaches. The baseline for the results is to run applications with parallel execution using METIS in the simulator. Itis also shown that SOSPCS is scalable to NoC-based heterogeneous systems with hundreds of cores.

TABLE I

BENCHMARKS

| Benchmarks | Description | # Nodes | # Edges |
|---|---|---|---|
| BP | Backpropagation | 476,012 | 893,471 |
| CNN | Convolutional Neural Nets | 1,107,434 | 1,728,723 |
| KM | K-Means Clustering | 787,645 | 925,336 |
| SVM | Support Vector Machine | 723,559 | 923,128 |
| NB | Naive Bayes | 548,664 | 803,267 |
| LR | Logistic Regression | 925,733 | 1,371,252 |

Figure 5:
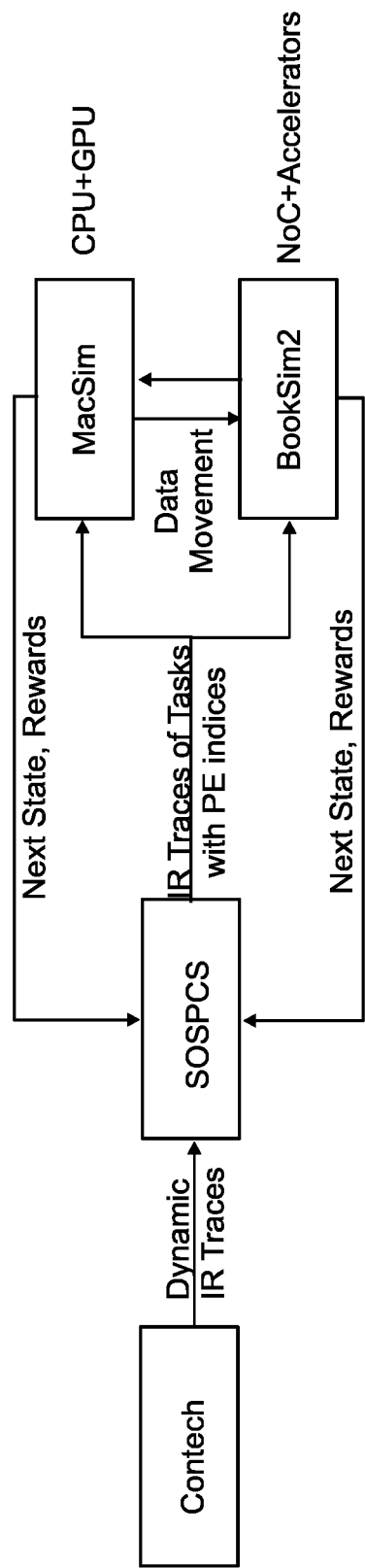
FIG. 5. Simulation flow of SOSPCS.

FIG. 5 shows the simulation flow. Contech [31] is used to generate dynamic LLVM IR traces from target applications and apply SOSPCS to generate IR traces of tasks and PE indices to which these tasks are mapped. Trace-driven timing simulators MacSim [23] and BookSim2 [16] execute these instructions and return the next state and rewards back to SOSPCS to help agents optimize themselves. As shown in Table II, a heterogeneous platform consisting of 32 CPUs and 32 GPUs is modeled using MacSim plus special HWAs with NoC substrate using BookSim2. HWAs are specific in each domain, e.g., FFT and MM in signal processing or ReLU and neurons in NNs. To validate the SOSPCS software implementation of SOSPCS, the configuration parameters of Table II are used. Note that in addition to mesh, SOSPCS is applicable to other topologies as well. Also, as mentioned earlier, the RL-based scheduler can incorporate any scheduling algorithm such as priority-based schedulers; however, for simplicity, first come first serve was chosen to handle new applications.

TABLE II

Configuration Parameters

| | | |
|---|---|---|
| CPU | Cores | 32 In-order cores, 16 MSHRs |
| | Clock frequency | 2.4 GHz |
| | L1 private cache | 64 KB, 4-way associative 32-byte blocks |
| | L2 shared cache | 256 KB, distributed |
| | Memory | 4 GB, 8 GB/s bandwidth |
| | Technology node | 22 nm |
| GPU | Number | 32 |
| | Clock frequency | 575 MHz |
| | Memory | 768 MB, 86.4 GB/s bandwidth |
| HWA | Types | MM, SGD, ReLU, Logarithm, . . . |
| Network | Topology | Mesh |
| | Routing algorithm | XY routing |
| | Flow control | Virtual channel flit-based |

A. Impact of γ on Community Count and Communication Overhead

Figure 6A:
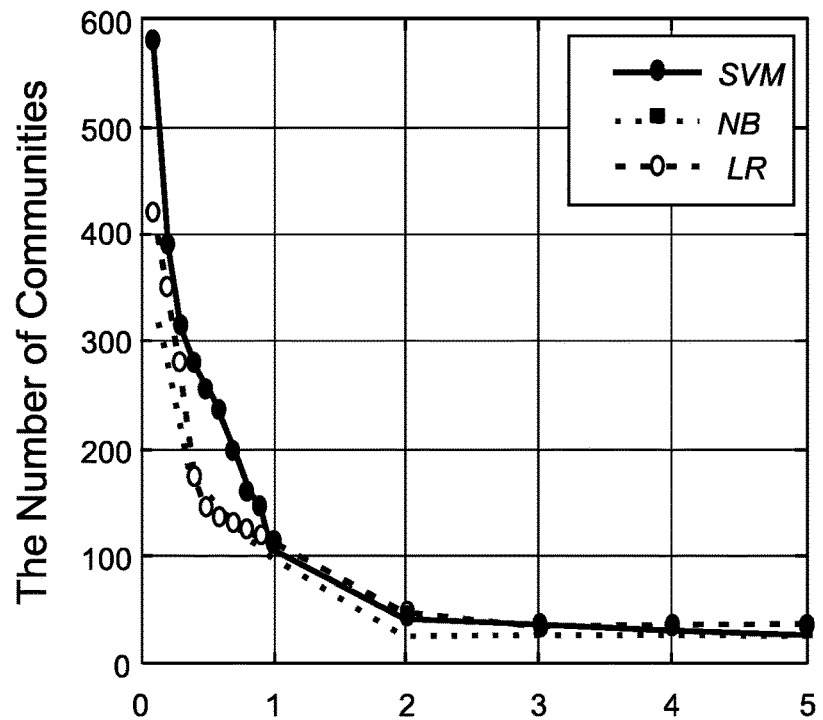
FIGS. 6A, 6B, 6C, 6D, 6E, 6F, 6G, and 6H. Performance evaluation of SOSPCS and comparison with state-of-the-art approaches.
Figure 6B:
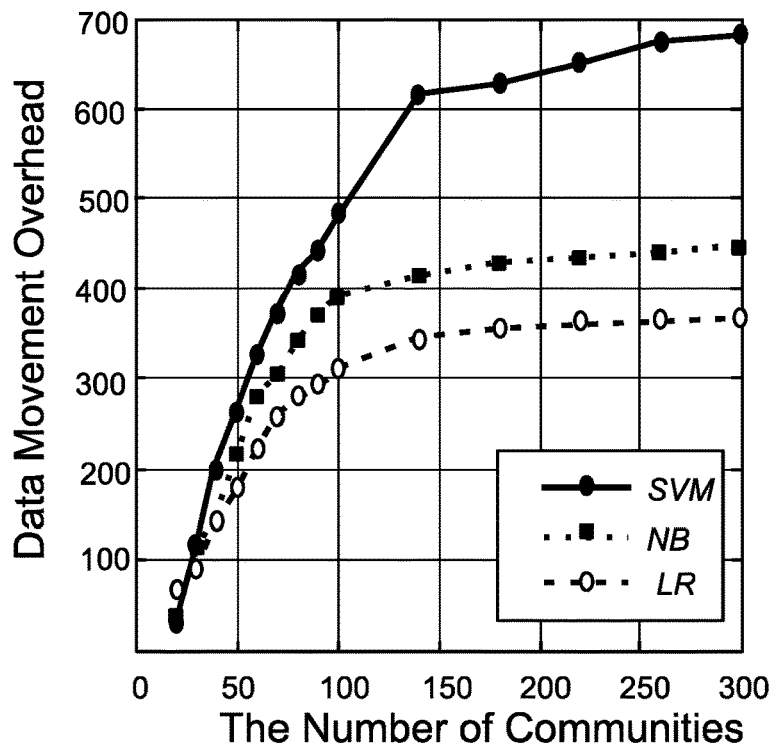

The parameter γ in (1) controls the number of communities partitioned from $\mathcal{IDG}$. Small community count indicates low data communication overhead, but the performance suffers as no more fine-grained parallelism exists. For simplicity, γ is set to 1. As demonstrated in FIG. 6(A), support vector machine (SVM), Naïve Bayes (NB), and logistic regression (LR) have 106, 97, and 112 communities, respectively. However, γ=1 may not be the best solution, as can be seen in FIG. 6(B). γ can be increased to reduce the number of communities, leading to low data movement overhead. However, there is a diminishing return when the number of communities exceeds a threshold, which is different across different applications. Therefore, an "elbow method" is employed to determine the best number of communities N. The objective function of SOSPCS in (1) is augmented with a data movement overhead [see FIG. 6(B)] to minimize communications cost. There are diminishing returns when an increase in the value of N leads to a decline in the additional quantity of data movement overhead. Mathematically, it is necessary to find an elbow at N* subject to $(df/dN)|_{N^-}-(df/dN)|_{N^+}>\xi$. When $\xi$ becomes larger and larger, in the end, the point which is called "elbow" is found.

Figure 6C:
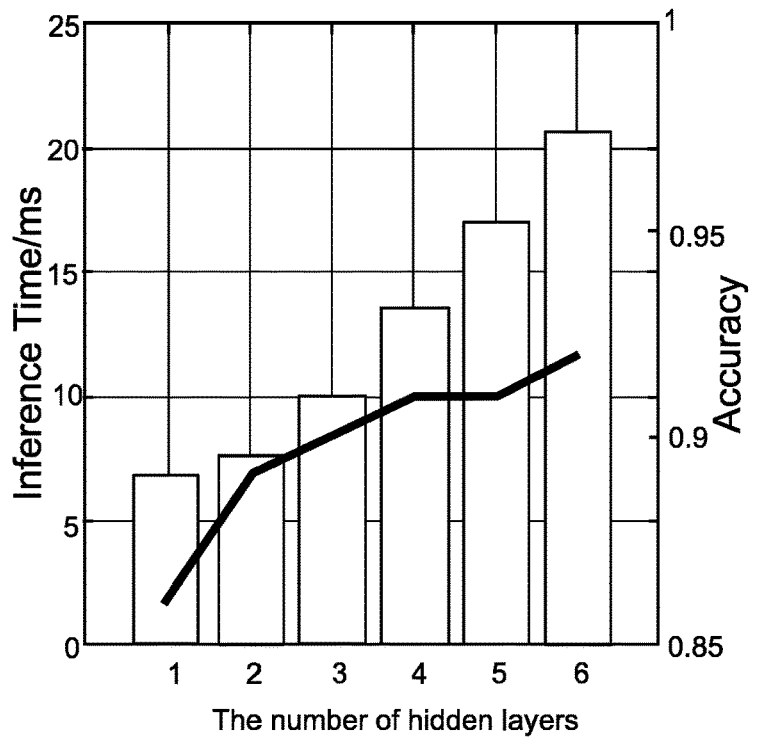
Figure 6D:
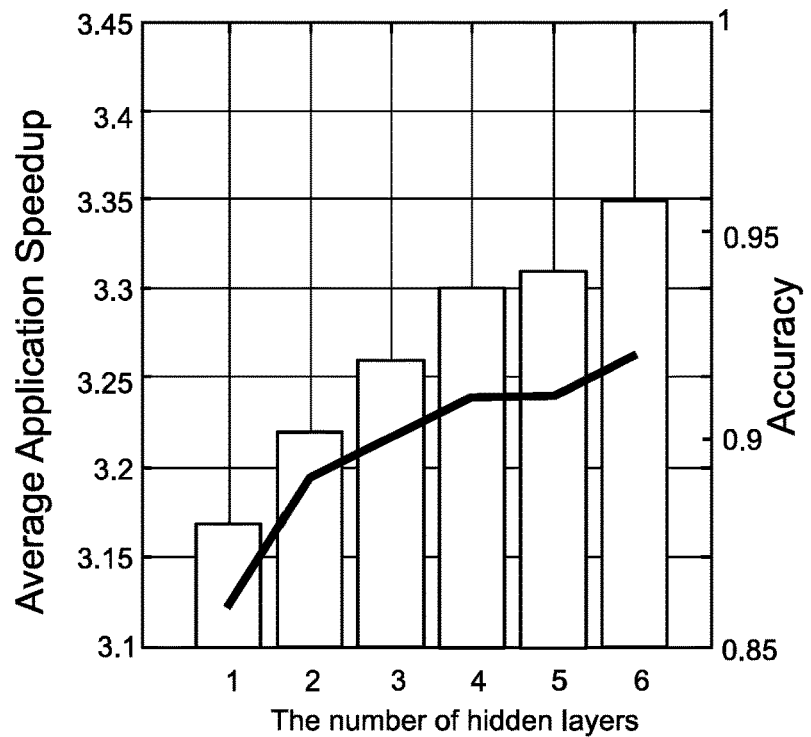

B. Effects of the Number of Hidden Layers on Inference Time, Accuracy, and Application Speedup FIG. 6(C) illustrates inference time and accuracy in terms of the number of HLs. With only three HLs, good accuracy (around 90%) in terms of the type of computations in each community while the inference time is tolerable (around 6.83 ms). These accuracy numbers are obtained from examining the feature index, and coordinates of NNs are identical to the ground truth. Although accuracy gets better with more number of HLs, it takes much more time to inference whether the $\mathcal{IDG}$ contains certain patterns learned during training. Since performance is critical at runtime, NNs with three HLs are chosen to classify the graphs. Accuracy of prediction of the task attributes influences the application speedup. Therefore, FIG. 6(D) illustrates the correlation between average application speedup and accuracy. With three HLs, average application speedup is 3.27× while the most time-consuming NN in the experiments with six HLs could only achieve 3.35×. Therefore, in order to trade off inference time and application speedup, NNs with three HLs was implemented. However, task misclassification has to be handled properly as the accuracy of the NN pipeline is approximately 90%. If a PE cannot evaluate a given task (e.g., an FFT task mapped to an MM accelerator), the task is migrated to general-purpose CPUs to be executed. However, a task is allowed to be executed to a PE if they are compatible (e.g., an MM task scheduled to GPUs). The accuracy of NNs has a significant impact on the task attribute and the ability to efficiently use heterogeneous resources.

C. Performance Comparison and Improvement

Figure 6E:
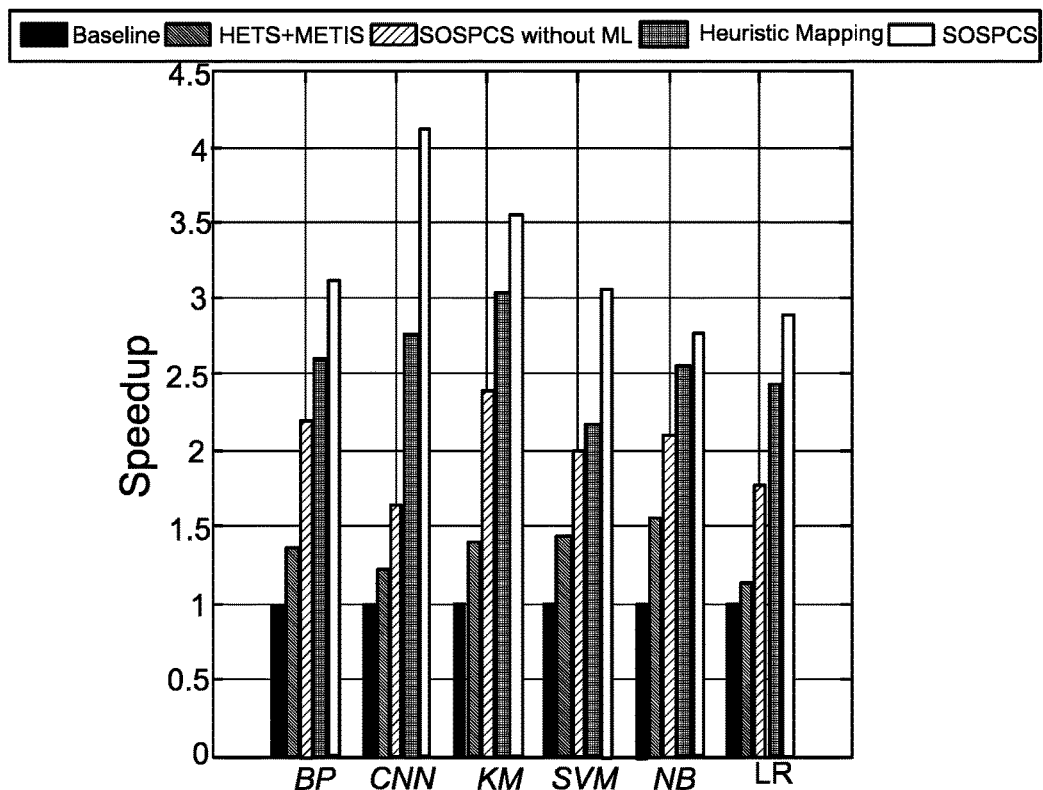

FIG. 6(E) shows the performance comparison among the baseline, HETS+METIS, and the SOSPCS approach with and without a machine learning strategy [41] for discovering the special patterns and mapping tasks. The SOSPCS approach achieves the best performance improvement from 2.78× to 4.12× including the learning overhead for all the considered applications in Table I because the SOSPCS approach partitions the graph into hybrid tasks to exploit the underlying NoC-based heterogeneous PEs. For example, after MM is detected, maximum pooling, and NN inference in the convolutional neural net (CNN) application graph, these special tasks are mapped onto accelerators instead of CPUs, which could potentially improve the system performance. SOSPCS is also compared with the heuristic mapping to quantitatively see the improvements of SOSPCS. Most applications demonstrate at least 20% performance improvement over a heuristic mapping. It is also noted that occasionally, tasks that are labeled as par are mapped onto CPUs. It is believed that this is mainly caused by traffic congestion in NoC.

Figure 6F:
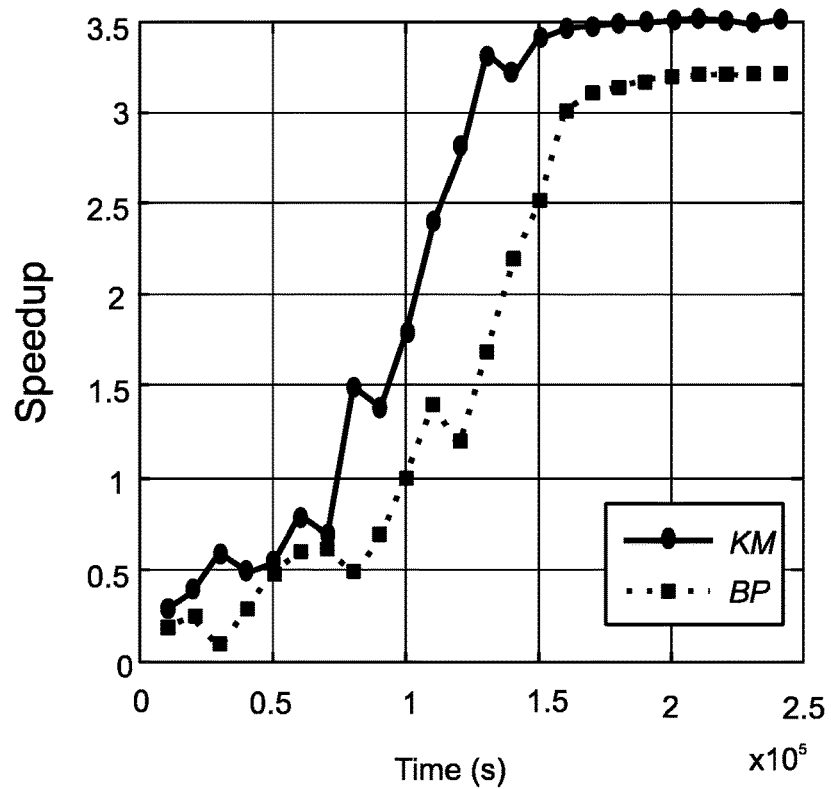

FIG. 6(F) shows the performance improvement of K-means (KM) clustering and backpropagation (BP) over time using SOSPCS. In the beginning, agents make some random actions (mapping of tasks) to explore the environment (NoC-based platform). It may not be the best action, according to the speedup. However, when they make bad actions, the environment returns back rewards such that agents can change the next action based on these rewards and the states to learn how to improve the long-term rewards. When agents have explored enough states, they are capable of selecting the best actions for the current states based on the Q values as indicated by the plateau in FIG. 6(F).

D. Energy Comparison

Figure 6G:
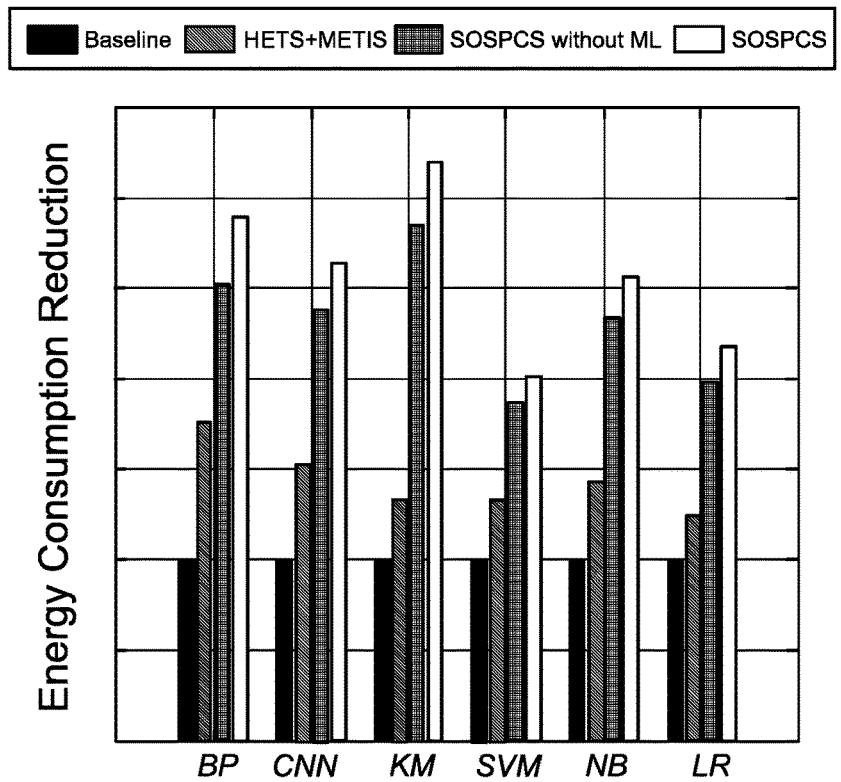

For energy consumption evaluation, MacSim develops power/energy model using McPAT [24]. FIG. 6(G) illustrates the energy reduction comparison among different approaches. SOSPCS outweighs METIS by at least 2× energy reduction because SOSPCS tries to minimize data movement across different tasks and fully exploit the heterogeneous platform by identifying the specialized features existing in target applications. However, the inventive approach has only 1.15× energy improvement over the same approach without machine learning. The reason may be that at the beginning of RL, agents need to explore the possible outcomes in the underlying heterogeneous platform to decide the best action. Therefore, it consumes some energy when a task is mapped to the wrong PE and migrates to the nearby PE suitable for the task. Nevertheless, the inventive approach achieves the best performance and energy consumption reduction compared to the state-of-the-art approaches.

E. Scalability Analysis

Figure 6H:
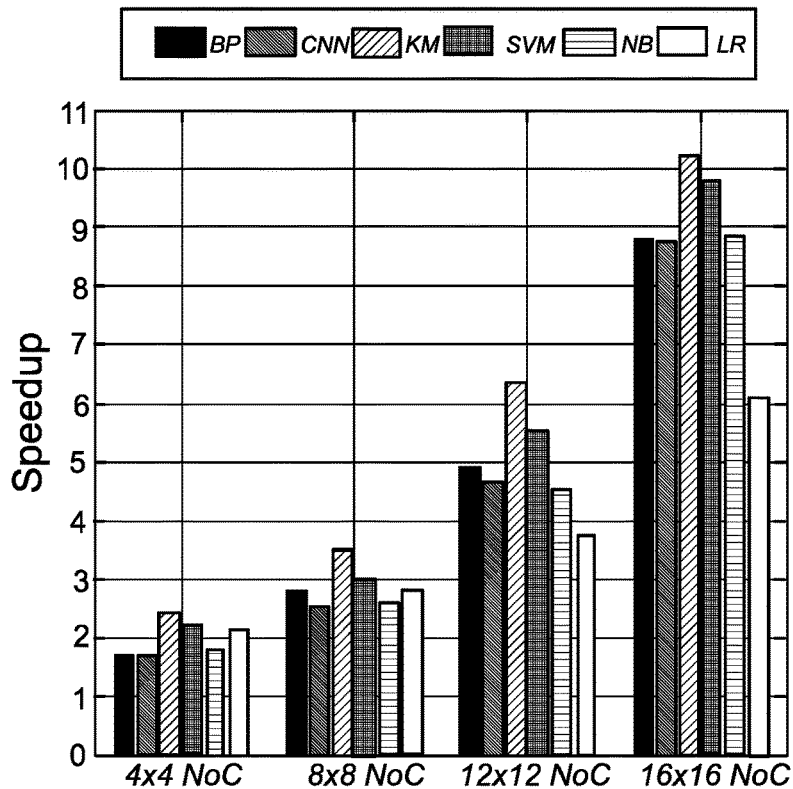

FIG. 6(H) summarizes the scalability analysis when considering several NoC configuration sizes and varying the number of communities by modifying the γ value such that there are enough tasks to be mapped onto NoC. If the size of NoC is doubled, γ is reduced by half to generate much more tasks than the number of PEs, which could increase the amount of data transferred among PEs. Nevertheless, when the size of NoC changes from 4×4 to 16×16, the speedup increases drastically. For example, when experimenting KM, is set to be 0.2 for the 16×16 NoC, which could generate at least 300 tasks. Then SOSPCS tries to map these tasks onto NoC. The results show that the speedup varies from 2.4× to 10.23× when the size of NoC changes from 4×4 to 16×16.

CONCLUSION

With CPUs, GPUs, and specialized HWAs coexisting on many cores, there is increasing tension between programmability of CPUs and efficiency of accelerators. Therefore, the present invention presents the SOSPCS framework that incorporates the necessary SDH and DSSoC capabilities to tackle issues such as performance inefficiency of general-purpose machines, inadequate programmability of domain-specific accelerators, and energy inefficiency of NoC by relying on NNs to classify task attributes and intelligent schedulers to manage the set of domain-specific tasks and enable reconfiguration of hardware components. First, target applications are transformed from LLVM IR into IDGs where nodes represent LLVM IR instructions, edges represent dependencies among instructions, and edge weights represent the amount of data to be transferred between two nodes. Based on IDGs, sliding window-based NN classifiers are proposed to detect existing patterns (MM/SGD/ReLU/ parallel for-loop structures) in IDGs. NN classifiers are trained offline with representative IDGs for various special patterns. The rest of the graph is then partitioned into interconnected communities (tasks) with minimal data communication overhead to reduce energy consumption. This forms the task pool consisting of heterogeneous tasks: tasks are more suitable for either CPUs with sequential execution or GPUs with parallel execution, or accelerators with special patterns. Next, the task allocator distributes tasks to agents following a load balancing goal. Distributed intelligent schedulers map tasks to PEs and reconfigure the hardware platform as required. The environment returns back the rewards representing whether the mapping is perfect. Based on these values, agents can learn the best mapping of hybrid tasks. Experiments were conducted on NoC-based heterogeneous PEs consisting of 32 CPUs, 32 GPUs, and HWAs such as MM and stochastic gradient descent in a machine learning domain. Results indicate that SOSPCS compared to state-of-the-art application scheduling algorithm provides performance and energy improvements as high as 4.12× and 3.24×, respectively. Future work will focus on further optimizations that will consider moving most of this framework analysis to hardware and minimizing the software requirements due to long delays.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1] W. Ahmed, M. Shafique, L. Bauer, and J. Henkel, "Adaptive resource management for simultaneous multitasking in mixed-grained reconfigurable multi-core processors," in Proc. CODES+ISSS, October 2011, pp. 365-374.

[2] V. D. Blondel, J. Guillaume, R. Lambiotte, and E. Lefebvre, "Fast unfolding of communities in large networks," J. Stat. Mech. Theory Exp., vol. 2008, no. 10, P. 10008, October 2008.

[3] P. Bogdan, T. Sauerwald, A. Stauffer, and H. Sun, "Balls into bins via local search," in Proc. SODA, January 2013, pp. 16-34.

[4] J. Castrillon, A. Tretter, R. Leupers, and G. Ascheid, "Communicationaware mapping of KPN applications onto heterogeneous MPSoCs," in Proc. DAC, June 2012, pp. 1266-1271.

[5] H. Chafi, A. K. Sujeeth, K. J. Brown, H. Lee, A. R. Atreya, and K. Olukotun, "A domain-specific approach to heterogeneous parallelism," ACM SIGPLAN Notices, vol. 46, no. 8, pp. 35-46, August 2011.

[6] M. Cheng, J. Li, and S. Nazarian, "DRL-cloud: Deep reinforcement learning-based resource provisioning and task scheduling for cloud service providers," in Proc. ASP-DAC, January 2018, pp. 129-134.

[7] J. Choi, H. Oh, S. Kim, and S. Ha, "Executing synchronous dataflow graphs on a SPM-based multi-core architecture," in Proc. DAC, June 2012, pp. 664-671.

[8] W. Choi et al., "On-chip communication network for efficient training of deep convolutional networks on heterogeneous manycore systems," IEEE Trans. Comput., vol. 67, no. 5, pp. 672-686, May 2018.

[9] S. Fortunato, "Community detection in graphs," Phys. Rep., vol. 486, nos. 3-5, pp. 75-174, 2010.

[10] G. Fox, S. Jha, and L. Ramakrishnan, "Stream2016: Streaming requirements, experience, applications and middleware workshop," LBNL, Berkeley, Calif., USA, Tech. Rep., 2016.

[11] B. Hendrickson and T. G. Kolda, "Graph partitioning models for parallel computing," Parallel Comput., vol. 26, no. 12, pp. 1519-1534, November 2000.

[12] Y. Hoskote, S. Vangal, A. Singh, N. Borkar, and S. Borkar, "A 5-GHz mesh interconnect for a teraflops processor," IEEE Micro, vol. 27, no. 5, pp. 51-61, September/October 2007.

[13] J. Huang, A. Raabe, C. Buckl, and A. Knoll, "A workflow for runtime adaptive task allocation on heterogeneous MPSoCs," in Proc. DATE, March 2011, p. 6.

[14] A. Jantsch, N. Dutt, and A. M. Rahmani, "Self-awareness in systems on chip-A survey," IEEE Des. Test, vol. 34, no. 6, pp. 8-26, December 2017.

[15] H. Javaid and S. Parameswaran, "A design flow for application specific heterogeneous pipelined multiprocessor systems," in Proc. DAC, July 2009, pp. 250-253.

[16] N. Jiang et al., "A detailed and flexible cycle-accurate network-on-chip simulator," in Proc. ISPASS, April 2013, pp. 86-96.

[17] N. P. Jouppi et al., "In-datacenter performance analysis of a tensor processing unit," in Proc. ISCA, June 2017, pp. 1-12.

[18] G. Karypis and V. Kumar, "A fast and high quality multilevel scheme for partitioning irregular graphs," SIAM J. Sci. Comput., vol. 20, no. 1, pp. 359-392, August 1999.

[19] G. Kestor, R. Gioiosa, D. J. Kerbyson, and A. Hoisie, "Quantifying the energy cost of data movement in scientific applications," in Proc. ISWC, September 2013, pp. 56-65.

[20] Y. Kwok, A. A. Maciejewski, H. J. Siegel, I. Ahmad, and A. Ghafoor, "A semi-static approach to mapping dynamic iterative tasks onto heterogeneous computing systems," J. Parallel Distrib. Comput., vol. 66, no. 1, pp. 77-98, January 2006.

[21] C. Lattner and V. Adve, "LLVM: A compilation framework for lifelong program analysis & transformation," in Proc. CGO, March 2004, p. 75.

[22] C. Lee, H. Kim, H. Park, S. Kim, H. Oh, and S. Ha, "A task remapping technique for reliable multi-core embedded systems," in Proc. CODES+ISSS, October 2010, pp. 307-316.

[23] J. Lee, S. Li, H. Kim, and S. Yalamanchili, "Design space exploration of on-chip ring interconnection for a CPU-GPU heterogeneous architecture," J. Parallel Distrib. Comput., vol. 73, no. 12, pp. 1525-1538, 2013.

[24] S. Li, J. H. Ahn, R. D. Strong, J. B. Brockman, D. M. Tullsen, and N. P. Jouppi, "McPAT: An integrated power, area, and timing modeling framework for multicore and manycore architectures," in Proc. MICRO, December 2009, pp. 469-480.

[25] S. Manolache, P. Eles, and Z. Peng, "Task mapping and priority assignment for soft real-time applications under deadline miss ratio constraints," ACM Trans. Embedded Comput. Syst., vol. 7, no. 2, p. 19, February 2008.

[26] A. Masood, E. U. Munir, M. M. Rafique, and S. U. Khan, "HETS: Heterogeneous edge and task scheduling algorithm for heterogeneous computing systems," in Proc. HPCC, August 2015, pp. 1865-1870.

[27] M. E. J. Newman, "Modularity and community structure in networks," Proc. Nat. Acad. Sci. USA, vol. 103, no. 23, pp. 8577-8582, 2006.

[28] M. E. J. Newman, "The structure and function of complex networks," SIAM Rev., vol. 45, no. 2, pp. 167-256, 2003.

[29] M. T. Office, "Electronics resurgence initiative," in Proc. DARPA, 2017, pp. 1-64.

[30] R. Piscitelli and A. D. Pimentel, "Design space pruning through hybrid analysis in system-level design space exploration," in Proc. DATE, March 2012, pp. 781-786.

[31] B. P. Railing, E. R. Hein, and T. M. Conte, "Contech: Efficiently generating dynamic task graphs for arbitrary parallel programs," ACM Trans. Archit. Code Optim., vol. 12, no. 2, p. 25, July 2015.

[32] A. Schranzhofer, J.-J. Chen, and L. Thiele, "Dynamic power-aware mapping of applications onto heterogeneous MPSoC platforms," IEEE Trans. Ind. Informat., vol. 6, no. 4, pp. 692-707, November 2010.

[33] A. K. Singh, T. Srikanthan, A. Kumar, and W. Jigang, "Communicationaware heuristics for run-time task mapping on NoC-based MPSoC platforms," J. Syst. Archit., vol. 56, no. 7, pp. 242-255, 2010.

[34] L. T. Smit, J. L. Hurink, and G. J. Smit, "Run-time mapping of applications to a heterogeneous SoC," in Proc. SOCC, November 2005, pp. 78-81.

[35] E. L. de Souza Carvalho, N. L. V. Calazans, and F. G. Moraes, "Dynamic task mapping for MPSoCs," IEEE Des. Test Comput., vol. 27, no. 5, pp. 26-35, September/October 2010.

[36] R. S. Sutton and A. G. Barto, Reinforcement Learning: An Introduction. Cambridge, Mass., USA: MIT press, 2018.

[37] M. B. Taylor et al., "Evaluation of the Raw microprocessor: An exposedwire-delay architecture for ILP and streams," in Proc. 31st Annu. Int. Symp. Comput. Archit., June 2004, vol. 32, no. 2, pp. 2-13.

[38] T. Theocharides, M. K. Michael, M. Polycarpou, and A. Dingankar, "Towards embedded runtime system level optimization for mpsocs: Onchip task allocation," in Proc. GVLSI, May 2009, pp. 121-124.

[39] L. Thiele, I. Bacivarov, W. Haid, and K. Huang, "Mapping applications to tiled multiprocessor embedded systems," in Proc. ACSD, July 2007, pp. 29-40.

[40] D. Wu, B. M. Al-Hashimi, and P. Eles, "Scheduling and mapping of conditional task graph for the synthesis of low power embedded systems," in Proc. Design, Automat. Test Eur. Conf. Exhib., September 2003, vol. 150, no. 5, pp. 262-273.

[41] Y. Xiao, Y. Xue, S. Nazarian, and P. Bogdan, "A load balancing inspired optimization framework for exascale multicore systems: A complex networks approach," in Proc. ICCAD, August 2017, pp. 217-224.

What is claimed is:

1. A method executed by a self-optimizing and self-programming computing system, the method comprising:

a transforming a target application at compile time from low-level virtual machine intermediate representation instructions into an instruction dependency graph with one or more trained neural network classifiers, the instruction dependency graph including nodes that denete denoting low-level virtual machine intermediate representation instructions, edges that-denote denoting data dependencies, and edge weights that denote denoting an amount of data to be transferred between two dependent instructions;

b) applying the one or more trained neural network classifiers to identify first partitions in the instruction dependency graph having predefined programming features;

c) applying community detection to identify remaining partition of partitions in the instruction dependency graph having wherein the partitions include clusters and or and/or tasks with minimized data communication comprising groups of instructions having intra-group data dependencies with greater cumulative weight than inter-group data dependencies; and d) mapping at runtime heterogeneous tasks to hardware components in a heterogeneous hardware platform using distributed intelligent schedulers configured to allocate tasks based on hardware availability and task requirements with distributed intelligent schedulers to fully utilize hardware components in a heterogeneous hardware platform such that performance is-maximized, the distributed intelligent schedulers mapping tasks onto either general central processing units (CPU), graphics processing units (GPU), or domain-specific programming elements, wherein the distributed intelligent schedulers are configured to reconfigure hardware as specified in target application requirements, and wherein the distributed intelligent schedulers are reinforced learning-based distributed intelligent schedulers configured to manage a set of domain resources required by the target application.

2. The method of claim 1 wherein the heterogenous hardware platform is a network on a chip.

3. The method of claim 1 wherein step d) is implemented without programmers writing domain-specific languages.

4. The method of claim 1 wherein the predefined programming features include a programming feature selected from the group consisting of loops for CPU, loops for GPUs, neurons in a neural network, activation functions, matrix multiplications, vector multiplication, gradient descent, for-loops in a machine learning domain, fast Fourier transforms, matrix multiplication, and combinations thereof.

5. The method of claim 4 wherein fast Fourier transforms and matrix multiplication are mapped to hardware accelerators and "for-loops" are mapped to graphics processing units with remaining tasks are mapped to central processing units.

6. The method of claim 4 wherein the target application has at least two predefined programming features.

7. The method of claim 1 wherein the one or more trained neural network classifiers are trained with sample programs having the predefined programming features.

8. The method of claim 7 wherein the one or more trained neural network classifiers have a predetermined number of hidden layers.

9. The method of claim 8 wherein the one or more trained neural network classifiers include sliding window-based neural network classifiers with three hidden layers.

10. The method of claim 9 wherein a first neural network and a second neural network are applied to a sliding window, the first neural network determining a predetermined programming feature type and the second neural network determining coordinates of each predetermined programming feature.

11. The method of claim 1 wherein principal component analysis is applied to neural network inputs to reduce the number of dimensions.

12. The method of claim 11 wherein inputs are normalized to obtain a normalized input by mean normalization is applied as $\mu_j = (1/m)\Sigma_{i=1}^{m} x_j^{(i)}$ where $x^{(i)}$ is an $i^{th}$ vector with $j^{th}$ input to the one or more trained neural networks classifiers, m is the number of $x^{(i)}$ vectors, and $u_j$ is the normalized input.

13. The method of claim 11 wherein after applying principal component analysis to reduce dimension and preserve main components, the self-optimizing and self-programming computing system is operable to drive a vectorized adjacency matrix, along with a normalized number of edges, average path length, clustering coefficient, average degree, and average betweenness centrality into neural networks.

14. The method of claim 1 wherein the one or more trained neural network classifiers are trained by collecting a group of training applications with different features, the different features selected from the group consisting of loops for CPUs, loops for GPUs, neurons in a neural network, activation functions, matrix multiplications, vector multiplication, gradient descent, for-loops in a machine learning domain, fast Fourier transforms, matrix multiplication, and combinations thereof.

15. The method of claim 1, wherein the self-optimizing and self-programming computing system is operable to minimize the number of messages among hardware resources to balance computation and communication.

16. The method of claim 1, wherein the self-optimizing and self-programming computing system is operable to allow multiple applications to be scheduled and run in parallel.

17. The method of claim 1, wherein hardware reconfigurability of the heterogeneous hardware platform facilitates consideration of application priority.

18. The method of claim 1, wherein automatically partitions target applications in one domain into interdependent tasks with different processing element affinities.

19. The method of claim 1, wherein the instruction dependency graph is constructed by:
   executing the target application to collect dynamic intermediate representation traces, the target application having a plurality of instructions;
   analyzing the dynamic intermediate representation traces to determine whether source registers of a current instruction depend on destination registers of the previous instructions such that if data dependencies exist, edges are inserted in between instruction nodes; and
   profiling the instructions to determine data size as edge weights in the instruction dependency graph wherein our approach combines static and dynamic program analysis.

20. The method of claim 1 wherein community detection identifies nonoverlapping communities that maximize a function Q in equation (1):

$$Q = \sum_{i=1}^{n_c} \left[ \frac{W^{(i)}}{W} - \left(\frac{S^{(i)}}{2W}\right)^2 \right] - \frac{\gamma |n_c - N|}{n_c} \quad (1)$$

where:
Q is a quality function for reinforced learning;
i is an integer label for a community;
$n_c$ is a number of partitioned communities;
N is a number of available CPUs;
γ represents a regularization parameter;
$W^{(i)}$ represents a sum of edge weights connected within community i;
W denotes a sum of weights of all edges; and
$S^{(i)}$ denotes a sum of all weights adjacent to community i, such that intracommunity weights are maximized and intercommunity weights are minimized.

21. The method of claim 1 wherein the distributed intelligent schedulers receive feedback from the heterogeneous hardware platform, the feedback including a next state and an immediate reward formulated in terms of types of tasks and availability of hardware components.

22. The method of claim 21 wherein the distributed intelligent schedulers give a negative reward to prevent an action of assigning a task to a busy processing element wherein if a target processing element is busy the task is migrated to a nearby processing element with a cost of network congestion and latency.

23. The method of claim 22 wherein the distributed intelligent schedulers apply Q-learning find an optimal policy for mapping tasks by interactively updating: $Q(s,a) = R(s,a) + \gamma \Sigma_s P_a(s,s') \max_a Q(s',a')$ wherein $P_a(s, s')$ is a probability of a transition from state s to another.

24. The method of claim 23 wherein Q (s, a) is approximated as:

$$Q(s,a) \leftarrow Q(s,a) + \alpha[r + \gamma \max_a Q(s',a') - Q(s,a)] \quad (5)$$

where $\alpha \Sigma [0, 1]$ is a learning rate; and
reward r is the immediate reward.

25. The method of claim 24 wherein after Q value is updated, an optimal action $a^* = \text{argmax}_a Q$ (s, a) is determined.

26. The method of claim 1 wherein the low-level virtual machine intermediate representation instructions include universal machine codes.

27. A method executed by a self-optimizing and self-programming computing system, the method comprising:
   a) transforming a target application at compile time from low-level virtual machine intermediate representation instructions into an instruction dependency graph with one or more trained neural network classifiers, the instruction dependency graph including nodes denoting low-level virtual machine intermediate representation instructions, edges denoting data dependencies, and edge weights denoting an amount of data to be transferred between two dependent instructions;
   b) applying the one or more trained neural network classifiers to identify first partitions in the instruction dependency graph having predefined programming features;
   c) applying community detection to identify remaining partitions in the instruction dependency graph having wherein the partitions include clusters and/or tasks comprising groups of instructions having intra-group data dependencies with greater cumulative weight than inter-group data dependencies; and
   d) mapping at runtime heterogeneous tasks to hardware components in a heterogeneous hardware platform using distributed intelligent schedulers configured to allocate tasks based on hardware availability and task requirements, the distributed intelligent schedulers mapping tasks onto either general central processing units (CPU), graphics processing units (GPU), or domain-specific programming elements, the distributed intelligent schedulers configured to receive feedback from the heterogeneous hardware platform, the feedback including a next state and an immediate reward formulated in terms of types of tasks and availability of hardware components.

* * * * *